July 14, 1970  M. G. VINJE ET AL  3,520,773
ALKALINE PULPING PROCESSES WITH CHEMICAL PRETREATMENT
Filed May 17, 1968
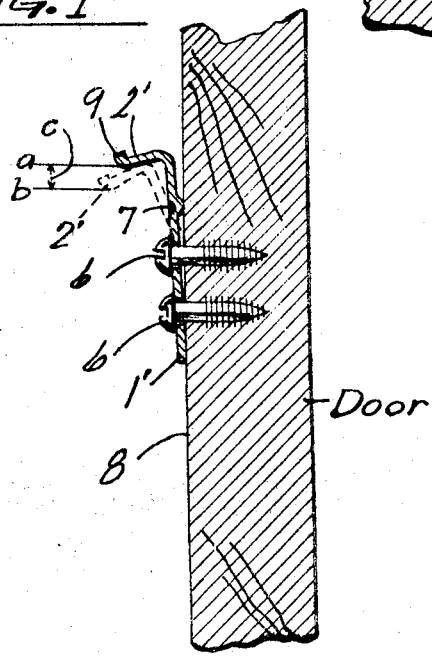
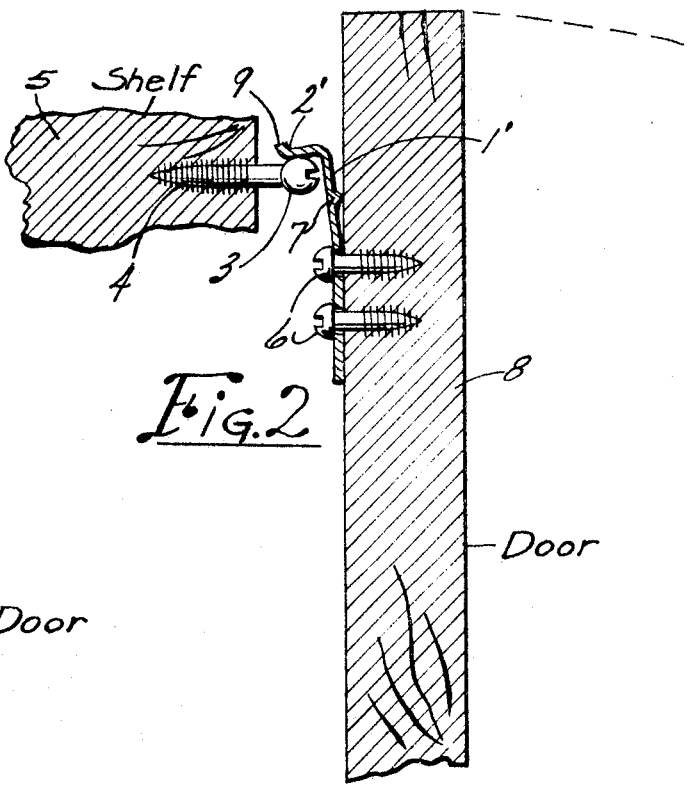
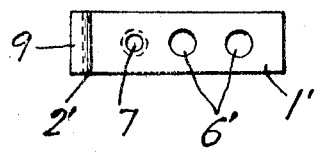
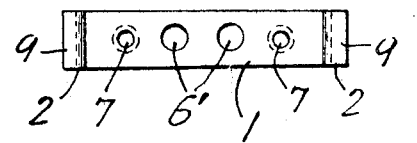
INVENTOR
RAY C. HOFFMAN
ATTORNEY 3,520,773
ALKALINE PULPING PROCESSES WITH CHEMICAL PRETREATMENT
Magnus G. Vinje, New Westminster, British Columbia, and Hans Worster, Richmond, British Columbia, Canada, assignors to MacMillan Bloedel Limited, Vancouver, British Columbia, Canada
No Drawing. Continuation-in-part of application Ser. No. 610,040, Jan. 18, 1967. This application May 17, 1968, Ser. No. 729,892
Int. Cl. D21c
U.S. Cl. 162—63
25 Claims

ABSTRACT OF THE DISCLOSURE

A pretreatment of lignocellulosic materials, such as wood chips or sawdust and the like prior to digestion in a kraft pulping process, a soda pulping process or an alkaline sulfite pulping process. In each case, the lignocellulosic materials are pretreated with hydrogen sulfide under heat and pressure in the presence of an alkaline buffer, such as sodium carbonate, sodium hydrosulfide, calcium oxide, calcium carbonate, kraft green or white liquor, soda green or white liquor, or alkaline sulfite green liquor. The lignocellulosic materials pretreated in this manner are then pulped in the usual manner in a kraft, soda or alkaline sulfite pulping process.

CROSS-REFERENCES TO RELATED APPLICATIONS

This is a continuation-in-part of our application Ser. No. 610,040, filed Jan. 18, 1967, and now abandoned.

BACKGROUND OF THE INVENTION

This invention relates to the manufacture of pulp and covers alkaline pulping processes, including kraft pulping, soda pulping and alkaline sulfite pulping processes, and includes a chemical pretreatment of the material to be pulped.

In conventional pulping by the kraft process, lignocellulosic materials, such as wood chips, annual plants, sawdust and the like are treated in a digester under controlled conditions of temperature, pressure and time with a liquor consisting of an aqueous solution of sodium hydroxide and sodium sulfide. After completion of cooking, the pulp is separated from the residual liquor, washed, and forwarded to further stages of processing. From the residual liquor, generally known as "black liquor," the spent reagents are recovered in a series of steps which form the recovery and recycling sequence of the conventional process. Thus, the residual liquor is oxidized to reduce the escape of volatile sulfur compounds, then concentrated in the evaporators and finally burnt in a recovery furnace, in which, after combustion of the organic constituents of the liquor, the inorganic constituents, notably the sodium salts, are left in the form of a smelt. The smelt is dissolved in water forming the so-called "green-liquor" which is essentially a solution of sodium carbonate and sodium sulfide. The green liquor, after removal of extraneous material, is treated with hydrated lime whereby the sodium carbonate in the solution is converted to sodium hydroxide, and the calcium carbonate is precipitated. The remaining liquor now consists of sodium hydroxide and sodium sulfide, essentially the composition of the original liquor, and it can now be re-used for pulping. To compensate for the loss of chemicals that occurs at various stages of operation, make-up chemical is added, usually in the form of sodium sulfate. This chemical is normally added to the black liquor entering the recovery furnace.

On the average, most softwoods consist of approximately 30% lignin, 65% cellulose plus hemicelluloses and 5% ash, resins and extractives, while most hardwoods consist of approximately 20% lignin, 75% cellulose plus hemicelluloses and 5% ash, resin and extractives. It is an object of the chemical pulping processes to remove lignin and extractives from the lignocellulosic material as these compounds are undesirable in the manufacture of many types of paper and other cellulosic products. Cellulose and hemicelluloses, on the other hand, are the desirable components. While the lignin is being dissolved by the cooking liquor, approximately one third of the cellulose and hemicelluloses of the lignocellulosic material is destroyed. As a result, relatively low pulp yields are obtained by the conventional pulping processes. For example, Western hemlock containing 68% cellulose plus hemicelluloses provides a kraft pulp yield of only 44% on wood, whereas quaking aspen containing 79% cellulose plus hemicellulose provides a soda pulp yield of only 50% on wood for a bleachable pulp, when in each case pulping is carried so far that a completely defibered bleachable pulp is obtained.

The conventional pulping by the soda process is a little different from that by the kraft process. In the soda process, the lignocellulosic materials are treated in a digester under controlled conditions of temperature, pressure and time with a liquor consisting essentially of an aqueous solution of sodium hydroxide. After the cooking and after separation of the pulp from the residual liquor, the black liquor, is subjected to a series of steps for the recovery of the spent chemicals, these steps forming the recovery or recycling sequence of the conventional soda process. Thus, the residual liquor is concentrated in evaporators and then burnt in a recovery furnace in which, after combustion of the organic constituents, the inorganic constituents, mainly the sodium salts, are left in the form of a smelt. This is dissolved in water to form the "green liquor" which is essentially a solution of sodium carbonate. This green liquor is treated in the same manner as in the kraft process. After the sodium carbonate has been converted to sodium hydroxide and the calcium carbonate has been precipitated, the remaining liquor is now essentially sodium hydroxide, and can be re-used for pulping after make-up chemical has been added, usually in the form of sodium carbonate or as sodium hydroxide.

In a conventional alkaline sulfite pulping process, lignocellulosic materials, such as wood chips, sawdust or annual plants, are treated in a digester under controlled conditions of temperature, pressure and time with a liquor consisting essentially of sodium sulfite and sodium hydroxide. The chemical applications are much higher than in kraft or soda pulping so that alkaline sulfite pulping is not widely used on a commercial scale. Typical conditions are given in the following Example 10. After completion of cooking, the pulp is separated from the residual liquor, washed and forwarded to further stages of processing such as bleaching and/or papermaking. From the residual "black" liquor, the spent chemicals are recovered in a series of steps which form the recovery and recycling sequence. Thus, the residual liquor is concentrated in evaporators and then burnt in a recovery furnace, where the inorganic sodium salts are left in the form of a smelt. The latter is dissolved in water forming the green liquor which is essentially a solution of sodium carbonate and sodium sulfide. The conversion of this green liquor to pulping liquor consisting of sodium hydroxide and sodium sulfite is relatively complicated and can be accomplished by a number of different methods. A very common method is the conversion of sodium sulfide to sodium carbonate and hydrogen sulfide by bubbling carbon dioxide gas into the green liquor. The green liquor then consists essentially of sodium carbonate which is converted to sodium hydroxide in essentially the same way as soda green liquor. The hydrogen sulfide expelled from the green liquor is burnt to sulfur dioxide, which in turn is bubbled into the sodium hydroxide solution and forms sodium sulfite. At this stage, the liquor is recycled to the digester. In order to compensate for the loss of pulping chemicals in pulping and recovery, make-up chemical is added, usually in the form of sodium sulfate to the concentrated black liquor.

Two methods have been proposed in the past for increasing the kraft and soda pulp yield. These are the addition of sodium borohydride or polysulfides to alkaline or soda pulping liquors or treatment of the lignocellulosic material with one of these chemical compounds prior to pulping. Normally, an application of one percent borohydride calculated on the dry weight of the lignocellulosic material gives a pulp yield increase of five to six percent on the raw material over the kraft or soda process. Similarly, a pulp yield increase of approximately one percent is obtained by the application of one percent polysulfide sulfur. The present price of sodium borohydride makes the application of this chemical compound in alkaline pulping prohibitive. If borohydried should ever be used in alkaline pulping, boron compounds would build up in the chemical recovery system of the pulp mill. The possible effects of boron compounds on the operation of the recovery plant are not yet known. One of the main reasons that polysulfide pulping is not used commercially as yet is the fact that polysulfide cannot be regenerated in the conventional pulp mill recovery process. Processes for the regeneration of polysulfide have been proposed but they are relatively complicated and consist of a number of operating steps. Considerably more air pollution with volatile sulfur compounds can be expected in polysulfide than in kraft pulping unless a closed system for the collection of these sulfur compounds is used. A five percent increase in pulp yield by the application of five percent polysulfide sulfur calculated on the dry weight of the wood would require approximately three times as much sulfur as that normally present in kraft pulping. This would result in high sulfur losses in the recovery furnace alone unless provision were made for efficient collection of the volatile sulfur compounds. In addition, steel corrosion has been claimed to be severe in kraft liquors with low polysulfide concentrations.

SUMMARY OF THE INVENTION

It is an object of this invention to provide an alkaline pulping process for the manufacture of pulp with significantly higher yields calculated on the dry weight of the lignocellulosic material than obtained in conventional kraft pulping, soda pulping and alkaline sulfite pulping to the same degree of delignification. Another objective of this invention is to provide a method for the recovery of the unconsumed chemicals in this process. Yet another objective is to provide a method for slightly reducing the pulping chemical requirement to a given degree of delignification for the kraft, soda and alkaline sulfite pulping processes. A still further object is to reduce the pulping time in the cooking stage of the kraft and soda processes.

These objects are achieved by pretreating lignocellulosic material with hydrogen sulfide in the presence of an alkaline buffer before being contacted with the digesting liquor in each alkaline pulping process.

DESCRIPTION OF THE PREFERRED EMBODIMENTS

According to this invention, a significant increase in pulp yields is obtained if lignocellulosic material, such as wood chips, sawdust and the like is pretreated with hydrogen sulfide under heat and pressure in the presence of an alkaline buffer which is compatible with the pulping liquors and added in an amount sufficient to maintain the pH of the spent pretreatment liquor in the neutral to slightly alkaline range as measured after the pressure has been released, pretreated lignocellulosic material is then pulped by the regular kraft soda or alkaline sulfite pulping process under conventional conditions. The required pH of the pretreatment liquor can be arrived at in any suitable manner, but the above is considered to be the simplest way of doing this.

As alkaline buffer there can be used any alkaline material which is compatible with the pulping liquors and which will maintain the pH above 6.5 and preferably in the slightly alkaline range as measured after releasing the pressure to one atmosphere. Examples of suitable alkaline buffers include diluted kraft, soda or alkaline sulfite green liquor, kraft or soda white liquor, sodium carbonate, sodium hydrosulfide, limestone and lime. The diluted kraft, soda, or alkaline sulfite green liquor, kraft white liquor or soda white liquor, provides a pH range of about 12 to 9, whereas small quantities of lime provides a pH range of about 12 to 7.

The lignocellulosic material can be first impregnated with the buffer and the impregnated material then introduced into a pressure vessel or reactor where it is contacted with the hydrogen sulfide, or the lignocellulosic material, buffer and hydrogen sulfide can be separately introduced into the pressure vessel or reactor for the hydrogen sulfide treatment. The treatment with hydrogen sulfide should be at a sufficient temperature and pressure to provide a thorough and uniform distribution of the hydrogen sulfide through the lignocellulosic material. Good results are obtained with conventional softwood or hardwood chips or sawdust are contacted with hydrogen sulfide at a temperature in the range of about 180° to about 330° F. and a pressure in the range of 80 to 500 p.s.i. Particularly good results were obtained at a temperature of about 260° F. to about 265° F. and a pressure of about 140 to about 150 p.s.i.

In the pretreatment for the kraft process, the buffer is generally present in amounts of 0.3 to 4% sodium carbonate, total alkali contained in green liquor, calcium oxide or calcium carbonate calculated on the dry weight of the lignocellulosic material. The buffer, in the pretreatment for the soda process, is generally present in amounts of 0.5 to 3% sodium hydroxide, total alkali contained in green liquor, calcium oxide, or calcium carbonate calculated on the dry weight of the lignocellulosic material.

Approximately 5 to 20% hydrogen sulfide calculated on the dry weight of the raw material is normally applied in the pretreatment for the kraft process, 1% hydrogen sulfide being consumed. The unreacted hydrogen sulfide is compressed and then re-used for the pretreatment of the lignocellulosic material. The unconsumed buffer is also re-used or can be fed to a kraft recovery system when its buffer capacity is exhausted. Kraft white liquor or lime from the kraft recausticizing system can conveniently serve as a source of fresh buffer solution.

Approximately 4 to 15% hydrogen sulfide calculated on the dry weight of the raw material is normally applied in the pretreatment for the soda process, with about 1% hydrogen sulfide being consumed. The unreacted hydrogen sulfide is separated by pressure relief, the steam is condensed and the hydrogen sulfide gas is then compressed and subsequently re-used for the pretreatment. The unconsumed buffer is also re-used and may be fed to the chemical recovery system of the soda pulp mill when its buffer capacity is exhausted. Soda white liquor or lime from the recausticizing system can conveniently serve as a source of fresh buffer solution.

It has been found that approximately 2% and 1% less alkali is required respectively for the kraft process and the soda process pretreatments to pulp chips according to this invention than by conventional kraft pulping and soda pulping without pretreatment, to a comparable degree of delignification. In addition, a considerably shorter pulping time for soda pulping of pretreated lignocellulosic material is required than for pulping without pretreatment.

According to one embodiment of the invention for the kraft pretreatment, wood chips or the like are fed into a pressure reactor and treated with 6.5 to 10% hydrogen sulfide based on the dry weight of the chips in the presence of about 0.1–0.2 pound of kraft green liquor or about 0.01 pound calcium oxide per pound of dry chips. The temperature of the reactor is raised to about 260° F. and, as a result, the pressure increased to about 140 p.s.i. At the end of the reaction, the pressure is relieved and the unreacted hydrogen sulfide gas is collected in a gas accumulator, compressed and, together with additional hydrogen sulfide, re-used for the treatment of chips in the pressure reactor. After the pressure relief, the part of the buffer solution which is not absorbed by the chips is separated from the chips and, after addition of make-up kraft liquor or lime, recycled to the pressure reactor. About 0.9 pound of diluted kraft liquor are absorbed per pound of dry wood.

The pretreated chips are then fed to a digester and pulped under conditions normally used in conventional kraft pulping. This shows a saving of about 2% in the amount of kraft liquor required as compared with the conventional kraft process without pretreatment.

As an alternative to the kraft pretreatment method described above, the wood chips are impregnated with diluted green liquor or lime in an impregnator vessel. After the impregnation, the free green liquor is separated from the chips and recycled to the impregnator. A certain quantity of fresh white liquor or lime is added to make-up the recycled solution. The impregnated chips are then fed to a pressure reactor where they are reacted with hydrogen sulfide gas under conditions similar to those used in the simultaneous treatment with diluted green liquor and hydrogen sulfide. At the end of the pressure reaction, the unconsumed hydrogen sulfide gas is separated from the chips by pressure relief, collected in a gas accumulator, compressed and reused. The treated chips are then fed to a digester and pulped by the conventional kraft process under normal conditions.

Both the chip pretreatment and the pulping can be performed as batch or continuous processes. The kraft, soda and alkaline sulfite pulping stages and the recovery processes for the conventional pulping chemicals are not affected by the pretreatment of lignocellulosic material with hydrogen sulfide and buffer solutions. As already stated above, approximately two percent less alkali calculated on the dry weight of the wood is required for pulping of pretreated chips than for pulping by the conventional kraft process to the same degree of delignification. It is, of course, essential that the unreacted hydrogen sulfide is collected after the chip pretreatment in order to realize the economical benefits due to the increased pulp yield and to minimize air pollution.

According to another embodiment of the invention for the soda pretreatment, wood chips are fed into a pressure reactor and treated with 6 to 9% hydrogen sulfide based on the dry weight of the lignocellulosic material in the presence of about 0.1 to 0.2 pound sodium carbonate or about 0.1 pound calcium oxide per pound of dry lignocellulosic material. The temperature of the reactor is raised to about 260° F. and, as a result, the pressure increases to 140–160 p.s.i. At the end of the reaction, the pressure is relieved and the unreacted hydrogen sulfide gas is collected in a gas accumulator. The steam is condensed and the hydrogen sulfide is compressed and, together with make-up hydrogen sulfide, re-used for the treatment of lignocellulosic material in the pressure reactor. After the pressure relief, the part of the buffer solution, which is not absorbed by the wood chips or the sawdust is separated and, after addition of make-up buffer liquor or lime, recycled to the pressure reactor.

The pretreated lignocellulosic material of the embodiment is then fed to a digester and pulped under conditions normally used in conventional soda pulping. In this stage, approximately 1% less active alkali has to be applied with pretreated material than in conventional soda pulping without pretreatment. Also, the cooking time can be shortened considerably as shown in Examples 6 and 9.

It is also possible to impregnate the wood chips or other lignocellulosic material with the buffer soltuion first and then to introduce the hydrogen sulfide gas at any point during the heat-up period. Both the pretreatment and the subsequent pulping stage can be performed as batch or as continuous processes. The pulping stage is not affected by the pretreatment except that somewhat less alkali is required to prepare a pulp with a given residual lignin content as already stated above.

According to still another embodiment of the invention for the alkyline sulfite pretreatment, chips are fed into a pressure reactor and treated with 5 to 15% hydrogen sulfide based on the dry weight of the lignocellulosic material in the presence of about 1 to 2% sodium carbonate or NaOH expressed as $Na_2O$ based on dry lignocellulosic material. The temperature of the reactor is raised to about 270° F. and, as a result, the pressure increases to 130–150 p.s.i. At the end of the reaction, the pressure is relieved and the unreacted hydrogen sulfide gas is collected in a gas accumulator. The steam is condensed and the hydrogen sulfide is compressed and, together with make-up hydrogen sulfide, re-used for the treatment of lignocellulosic material in the pressure reactor. After the pressure relief, the part of the buffer solution, which is not absorbed by the wood chips or the sawdust, is separated and, after addition of make-up alkaline sulfite green liquor or lime, recycled to the pressure reactor.

The pretreated lignocellulosic material is then fed to a digester and pulped under conditions normally used in conventional alkaline sulfite pulping. In this stage, approximately 2% less pulping chemical has to be applied with pretreated material than in conventional alkaline sulfite pulping without pretreatment.

It is also possible to impregnate the wood chips or other lignocellulosic material with the buffer solution first and then to introduce the hydrogen sulfide gas at any point during the heat-up period.

Both the pretreatment and the subsequent pulping stage can be performed as batch or as continuous processes. The pulping stage is not affected by the pretreatment except that somewhat less pulping chemical is required to prepare a pulp with a given residual lignin content as already stated above.

The following examples of pilot plant productions are given to illustrate this invention involving the kraft process.

Example 1

A 50/50 mixture of Western hemlock and Douglas fir chips having an average moisture content of 48.7 percent was placed in a rotating pressure reactor together with 0.20 pounds kraft green liquor and 4.3 pounds water per pound of moisture-free wood. The sodium compounds such as carbonate, hydroxide and sulfide contained in the green liquor corresponded to 2.0 percent total alkali on wood. A quantity of 0.083 pounds of compressed hydrogen sulfide gas per pound of moisture-free wood was then fed to the reactor and the temperature was raised to 257° F. in 83 minutes by indirect heating. The reaction mixture was kept at this temperature level for 79 minutes before the temperature was gradually decreased to 230° F. in 41 minutes. The reactor was rotated continually during the reaction sequence. As a result of the temperature changes, the hydrogen sulfide pressure increased from 126 p.s.i. at room temperature to 144 p.s.i. at 260° F. after a total reaction time of 205 minutes. At this point the gas was relieved and the contents of the reaction vessel allowed to cool to a temperature below the boiling point of water. The free buffer solution was then separated from the chips, and the kraft white liquor containing 16.5 percent active alkali on wood was added to the chips. The kraft cook was performed under the following conditions: liquor to wood ratio 4.5 to 1, indirect heating to a temperature of 338° F. in 104 minutes and a reaction time of 120 minutes at this temperature. The pulp was washed, and then the permanganate number, which is a measure for the lignin content of the pulp and the pulp yield were determined. The following results were obtained:

TAPPI permanganate number (40 ml.) _____ 22.9
Pulp yield, percent on dry wood _____ 49.4
Screen rejects, percent on dry wood _____ 0.5

A conventional kraft pulp performed with the same batch of chips under the same conditions as used for the pretreated chips, except that 18.2 perecnt active alkali caluculated on the dry weight of the wood was applied, provided a pulp yield of 43.4 percent and 0.8 percent screen rejects calculated on a wood at a permanganate number of 22.9. A Valley beater evaluation provided the following results on the pulp from pretreated chips and untreated chips:

TABLE I

[Properties of pulp obtained in 49.4% yield, calculated on wood, at a permanganate number of 22.9 and a conventional kraft pulp at 35 minutes of beating]

| Pulp | Mullen | Breaking length (km.) | Apparent specific gravity of sheets |
|---|---|---|---|
| Two-stage hydrogen sulfide-kraft | 194 | 10.6 | 0.64 |
| Conventional kraft | 197 | 11.5 | 0.66 |

The data indicate that the two types of pulp do not differ significantly in quality when the same amount of power is used for beating.

Bleaching of the two-stage pulp and the kraft pulp described above by a six-stage bleaching sequence (C-E-H-D-E-D) indicated that the yield advantages obtained by this novel pulping process is retained through the bleaching sequence. The bleached pulp yield of the two-stage pulp was 6 percent higher (46 vs. 40 percent) calculated on the dry wood of the wood than that obtained with the conventional kraft pulp.

Example 2

The hemlock and fir chips described in Example 1 were treated in a pressure reactor with 0.071 pounds of hydrogen sulfide, 0.20 pounds of kraft green liquor and 4.1 pounds of water per pound of moisture-free wood. The temperature was raised to 257° F. by indirect heating in 93 minutes and kept at this level for 95 minutes and gradually decreased to 245° F. in 25 minutes. The pressure varied from 140 p.s.i. initial pressure at room temperature to 134 p.s.i. at 260° F. in the maximum temperature range to 108 p.s.i. at the final temperature of 245° F. At the end of the 213 minutes reaction period, the pressure was relieved. The free buffer solution was then withdrawn from the chips, and subsequently kraft white liquor containing 16.5 percent active alkali on wood was charged to the pretreated chips. The kraft cook was performed under the same conditions as described in Example 1. The washed pulp was obtained with:

TAPPI permanganate number (40 ml.) _____ 23.5
Pulp yield, percent on dry wood _____ 49.8
Screen rejects, percent on dry wood _____ 0.6

A conventional kraft pulp performed with the same batch of chips under the same conditions as used for the pretreated chips, except that 17.5 percent active alkali calculated on the dry weight of the wood was applied, provided a pulp yield of 43.3 percent and 0.8 percent screen rejects calculated on wood at a permanganate number of 23.5. A Valley beater evaluation provided the following results on the pulp from pretreated chips and untreated chips:

TABLE II

[Strength properties of pulp obtained in 49.8% yield, calculated on wood at a permanganate number of 23.5 and a conventional kraft pulp after 35 minutes of beating]

| Pulp | Mullen | Breaking length, km. | Apparent specific gravity of sheet |
|---|---|---|---|
| Two-stage hydrogen sulfide-kraft | 192 | 11.5 | 0.67 |
| Conventional kraft | 197 | 11.5 | 0.66 |

These data show that there is no significant difference in quality of the two pulps at a given power input on beating.

Bleaching of the two-stage pulp and the conventional kraft pulp described in this example by a six-stage bleaching sequence showed that this novel pulping method provided a 5.3 percent higher bleached pulp yield (44.9 vs. 39.6 percent on wood) than the conventional kraft process.

Example 3

Douglas fir chips having a moisture content of 45.2 percent was placed in a rotating pressure reactor together with 0.02 pounds sodium carbonate and 4.2 pounds water per pound of moisture-free-wood. A quantity of 0.070 pound of compressed hydrogen sulfide gas per pound of moisture-free chips was then fed to the reactor and the temperature was raised to 257° F. in 80 minutes by indirect heating. The reaction mixture was kept at this temperature level for 90 minutes before the temperature was gradually decreased to 200° F. in 30 minutes. The pressure vessel was rotated continuously for the first 80 minutes and only once every 10 minutes for the remaining 120 minutes. As a result of the temperature changes, the pressure changed from an initial 142 p.s.i. at room temperature to 149 p.s.i. at the maximum temperature of 263° F. to 96 p.s.i. at the final temperature of 200° F. At the end of the 200 minute reaction period, the pressure was relieved and the free buffer solution withdrawn from the chips. Kraft white liquor, containing 15.5 percent active alkali on wood, was charged to the chips. The kraft cook was performed under the same conditions as described in Example 1 except that the liquor to wood ratio was 4.2 to 1. The washed pulp was obtained with:

TAPPI permanganate number (40 ml.) _____ 24.3
Pulp yield, percent on dry wood _____ 52.7
Screen rejects, percent on dry wood _____ 0.4

A conventional kraft cook performed with the same batch of chips under the same conditions as used for the pretreated chips, except that the liquor to wood ratio was 4.5 to 1 and that 17.8 percent alkali calculated on the dry weight of the wood was applied, provided a pulp yield of 43.9 and 1.7 percent screen rejects calculated on wood at a permanganate number of 23.8. A Valley beater evaluation provided the following results on the pulps prepared from pretreated chips and untreated chips:

TABLE III

Properties of pulp obtained in 52.7 percent yield, calculated on wood, at a permanganate number of 24.3 and of conventional kraft pulp at a permanganate number of 23.8 after 35 minutes of beating]

| Pulp | Mullen | Breaking length, km. | Apparent specific gravity of sheets |
|---|---|---|---|
| Two-stage hydrogen sulfide-kraft | 192 | 12.0 | 0.66 |
| Conventional kraft | 192 | 10.8 | 0.65 |

The data indicate that the two types of pulp do not differ significantly in quality when the same amount of power is used for beating.

Example 4

The Douglas fir chips described in Example 3 were treated in a pressure reactor with 0.070 pounds of hydrogen sulfide, 0.005 pounds calcium oxide and 4.2 pounds water per pound of moisture-free-wood. The temperature was raised to 257° F. in 82 minutes by indirect heating and kept at this level for 80 minutes and gradually decreased to 200° F. in 40 minutes. The pressure vessel was rotated continuously for the first 82 minutes and only once every 10 minutes for the remainder of the 202 minute reaction period. The initial pressure of 145 p.s.i. at room temperature increased to 148 p.s.i. at the maximum temperature of 265° F. and decreased to 105 p.s.i. at the final temperature of 220° F. After the pressure was relieved, the free buffer solution was withdrawn, and 15.5 per cent active alkali on wood was charged to the pretreated chips. The kraft cook was performed under the same conditions as described in Example 3. The washed pulp was obtained with:

TAPPI permanganate number (40 ml.) _____ 24.8
Pulp yield, percent on dry wood _____ 50.0
Screen rejects, percent on dry wood _____ 0.9

As mentioned in Example 3, a conventional kraft cook performed with the same chips provided a pulp yield of 43.9 percent and 1.7 percent screen rejects calculated on wood at a permanganate number of 23.8. A Valley beater evaluation provided the following results on the pulps from pretreated chips and untreated chips:

TABLE IV

[Properties of pulp obtained in 50.0 percent yield, calculated on wood, at a permanganate number of 24.8 and of a conventional kraft pulp at a permanganate number of 23.8 after 25 minutes of beating]

| Pulp | Mullen | Breaking length, km. | Apparent specific gravity of sheets |
|---|---|---|---|
| Two-stage hydrogen sulfide-kraft | 184 | 9.65 | 0.650 |
| Conventional kraft | 192 | 10.8 | 0.645 |

The data indicate that the two types of pulp do not differ significantly in quality when the same amount of power is used for beating.

Example 5

The mixture of hemlock and fir chips described in Example 1 was treated in a pressure reactor with 0.067 pound of hydrogen sulfide, 0.089 pound of calcium carbonate and 4.5 pounds of water per pound of moisture-free wood. The temperature was raised to 257° F. by indirect heating in 87 minutes and kept at this level for 80 minutes and gradually decreased to 232° F. in 40 minutes. The pressure varied from 145 p.s.i. initial pressure at room temperature to 120 p.s.i. at 257° F. in the maximum temperature range to 98 p.s.i. at the final temperature of 245° F. At the end of the 207 minutes reaction period, the pressure was relieved, and the free buffer solution withdrawn from the chips. Subsequently kraft white liquor, containing 16.5 percent active alkali on wood, was charged to the pretreated chips. The kraft cook was performed under the same conditions as described in Example 1. The washed pulp was obtained with:

TAPPI permanganate number (40 ml.) _____ 23.7
Pulp yield, percent on dry wood _____ 48.8
Screen rejects, percent on dry wood _____ 0.3

As stated in Example 2, a conventional kraft pulp was obtained in a yield of 43.3 percent and with 0.8 percent screen rejects, calculated on wood, at a permanganate number of 23.5. A Valley beater evaluation provided the following results on the pulp from pretreated chips and untreated chips.

TABLE V

[Strength properties of pulp obtained in 48.8 percent yield calculated on wood, at a permanganate number of 23.7 and of a conventional kraft pulp at a permanganate number of 23.5 after 35 minutes of beating]

| Pulp | Mullen | Breaking length, km. | Apparent specific gravity of sheets |
|---|---|---|---|
| Two-stage hydrogen sulfide-kraft | 190 | 11.7 | 0.67 |
| Conventional kraft | 197 | 11.5 | 0.66 |

These data show that there is no significant difference in quality of the two pulps at a given power input on beating.

The following examples of pilot plant productions are given to demonstrate the invention incorporating the soda pulping process:

Example 6

Quaking aspen chips from the Whitecourt area of Northwestern Alberta having an average moisture content of 55 percent were placed in a stationary pressure reactor with forced liquor circulation, together with an aqueous solution containing 16.8% sodium hydroxide calculated as sodium oxide and based on bone dry wood. The liquor temperature was raised to 170° C. in 105 minutes by circulation through a heat exchanger and was kept at this temperature for 150 minutes. The digester contents were then blown under pressure into a blow tank. The following results were obtained with this conventional soda cook:

TAPPI permanganate number (40 ml.) _____ 9.6
Screened pulp yield,[1] percent on B.D. wood _____ 50.2
Screen rejects,[2] percent on B.D. wood _____ 0.5

[1] Material passing through a 0.012 in. cut screen.
[2] Material retained on a 0.012 in. cut screen.

Delignifying bleaching of the aspen soda pulp with an excess of sodium chlorite and acetic acid gave the following results:

Delignified pulp yield, percent on wood _____ 45.3
Elrepho brightness of bleached pulp _____ 75.1

A standard beater evaluation of this pulp by means of the Valley beater provided the following data:

| | | |
|---|---|---|
| Canadian standard freeness, ml | 500 | 300 |
| Beating time, min | 9 | 28 |
| Mullen | 76 | 117 |
| Tear | 109 | 97 |
| Breaking length, km | 6.8 | 9.6 |
| Sheet density | 0.66 | 0.76 |
| Brightness | 36.5 | 32.7 |

Example 7

The aspen chips described in Example 6 were treated in the pressure reactor used in that example with 6.9% hydrogen sulfide and an aqueous solution containing 1.4% sodium carbonate calculated as sodium oxide and based on bone dry wood. The temperature of the liquor was raised to 130° C. in 33 minutes and this temperature was maintained for 39 minutes. The maximum pressure of 144 p.s.i. was reached at the maximum temperature. The initial pH of the sodium carbonate solution was 11 and it decreased to 8.3 at the end of the pretreatment. The unconsumed hydrogen sulfide was removed by pressure relief and the spent liquor was separated from the pretreated chips by means of draining. Soda white liquor containing 15.7% sodium hydroxide expressed as sodium oxide and based on bone dry wood was then added to the pretreated chips. The liquor temperature was raised to 170° C. in 67 minutes and kept at this temperature for 120 minutes. These times are considerably shorter than those reported in Example 6 for soda pulping without pretreatment. As a result, the pretreatment stage plus the soda pulping stage combined required practically the same time as soda cooking only without pretreatment (259 vs. 255 minutes). The following results were obtained with the pretreatment-soda cook:

TAPPI permanganate number (40 ml.) _____ 9.0
Screened pulp yield, percent on B.D. wood _____ 55.1
Screen rejects, percent on B.D. wood _____ 0.2
Hydrogen sulfide absorbed by pretreated chips, percent on B.D. wood _____ 0.97

A comparison of these data with those given in Example 6 show clearly that at the same degree of pulping, 5% more screen pulp yield based on B.D. wood (55 vs. 50%) was obtained with pretreated aspen chips. In addition, the quantity of screen rejects decreased from 0.5 to 0.2% on B.D. wood.

Delignifying bleaching of the aspen pretreatment-soda pulp with an excess of sodium chlorite and acetic acid provided the following results:

Delignified pulp yield, percent on wood _____ 54.4
Elrepho brightness of bleached pulp _____ 76.1

A comparison of these data with those given in Example 6 shows that the pulp yield increase obtained by the pretreatment was retained after complete delignification and due to stabilization of wood carbohydrates the comparison also indicates that the bleached pretreatment-soda pulp had a one point higher brightness than a comparable conventional soda pulp.

A standard Valley beater evaluation of this pulp gave the following results:

| | | |
|---|---|---|
| Canadian standard freeness, ml | 500 | 300 |
| Beating time, min | 1 | 23 |
| Mullen | 75 | 138 |
| Tear | 115 | 98 |
| Breaking length, km | 7.4 | 9.9 |
| Sheet density | 0.67 | 0.79 |
| Brightness | 37.0 | 32.2 |

These data show that the quality of this pretreatment-soda pulp is somewhat superior to that of the comparable conventional soda pulp described in Example 6. The pretreatment-soda pulp is beaten more readily, which results in power savings in papermaking, and has a higher mullen at 300 ml. Canadian Standard Freeness.

Example 8

Western hemlock sawdust obtained from a sawmill in Southwestern British Columbia was placed in a rotating pressure reactor equipped with a steam jacket. The sawdust had a moisture content of approximately 45% and the following particle size distribution.

| Screen of Williams' Chip Classifier, Inc.: | Percent retained on screen |
|---|---|
| 5/8 | 0.1 |
| 3/8 | 1.3 |
| 3/16 | 18.5 |
| 1/8 | 27.4 |
| 3/32 | 18.5 |
| Thru 3/32 | 34.2 |

A sodium hydroxide solution containing 20.9% NaOH expressed as $Na_2O$ and calculated on the dry weight of wood was added to the sawdust and the temperature inside the reactor was raised from approximately 70° F. to 338° F. in 38 minutes. This temperature was maintained for 80 minutes. The digester contents was then blown at a pressure of approximately 90 p.s.i. into a "blow tank." The following results were obtained.

| | Measured | Extrapolated* |
|---|---|---|
| TAPPI permanganate number (40 ml.) | 26.5 | 17.9 |
| Screened pulp yield, percent on bone dry wood | 41.7 | 40.0 |
| Screen rejects, percent on bone dry wood | 0 | 0 |

*Extrapolated from a curve showing the pulp yield-permanganate number relationship for this sawdust.

Delignification of the soda pulp (with permanganate number 26.5) with an excess of sodium chlorite and acetic acid (for pH adjustment) gave the following data.

Pulp yield after chlorite delignification, percent on bone dry soda pulp _____ 94.7
Bone dry wood _____ 39.5

Example 9

The hemlock sawdust described in Example 8 was treated in the rotation pressure reactor used in that example with 9.4% hydrogen sulfide and 1.4% sodium carbonate in aqueous solution based on the dry weight of the sawdust. The temperature of the reactor contents was raised to 126° C. in 19 minutes and kept at this temperature for 43 minutes. The pressure rose to 140 p.s.i. After the 43 minute period, the gas was removed from the reactor by pressure relief and collected in an accumulator for re-use. The free aqueous solution was removed by draining.

A sodium hydroxide solution containing 20.9% NaOH calculated as $Na_2O$ on dry wood was then added to the pretreated sawdust and the temperature of the digester contents was raised from 70° F. to 338° F. in 25 minutes. This is a shorter time than that used in Example 8 with non-treated sawdust. The temperature of 338° F. was maintained for 80 minutes. After this time, the digester contents was blown at approximately 90 p.s.i. into a "blow tank." The following results were obtained with the pretreated sawdust.

TAPPI permanganate number (40 ml.) _____ 17.9
Screened pulp yield, percent on bone dry wood ____ 46.0
Screen rejects, percent on bone dry wood _____ 0.1

A comparison of these data with those shown in Example 8 shows clearly that the pretreated sawdust gave a significantly higher pulp yield than comparable non-treated sawdust.

Delignification of the pretreatment-soda pulp with sodium chlorite and acetic acid under the same conditions as used in Example 8 provided the following results:

Pulp yield after chlorite delignification, percent on bone dry pretreatment-soda pulp _____ 97.7
Bone dry wood _____ 45.0

These data show clearly that the increased pulp yield obtained by the pretreatment is maintained after delignification and, therefore, presents a stabilization of wood carbohydrates against alkaline degradation, which normally occurs in soda pulping.

The following are examples of pilot plant productions to illustrate the present invention involving the alkaline sulfite pulping process:

Example 10

Alkaline sulfite pulping without pretreatment.

A 60/40 mixture of Western hemlock-Douglas fir chips with a moisture content of approximately 50% was placed in a stationary pressure reactor together with an aqueous solution containing 30% sodium sulfite and 18% sodium hydroxide calculated on dry wood. The temperature was raised from approximately 70° F. to 356° F. in 105 minutes by circulating the liquor through a heat exchanger. The temperature was kept at 356° for 105 minutes, and the reaction mixture was then blown into a blow tank. The pulp was washed and screened and pulp yield and permanganate number were determined. The following results were obtained:

TAPPI permanganate number (40 ml.) _____ 23.4
Pulp yield, percent on dry wood _____ 41.1
Screen rejects, percent on dry wood _____ 1.5

A standard Valley beater evaluation of the pulp provided the following data after 35 minutes beating:

Mullen _____ 193
Breaking length, km. _____ 12.2
Apparent specific gravity of sheet _____ 0.68

Example 11

Alkaline sulfite pulping with pretreatment.

A chip mixture with the same species composition as used in Example 10 was treated in the same pressure reactor with 7.2% hydrogen sulfide gas and 1.4% sodium carbonate on wood calculated as sodium oxide. The reaction mixture was heated to 270° F. in 30 minutes and the pressure rose to 136 p.s.i. The temperature of 266° was maintained for 36 minutes. The unconsumed hydrogen sulfide gas was then removed by pressure relief and the free liquor was separated by draining. Subsequently, as aqueous solution containing 29.0% sodium sulfite and 17.2% sodium hydroxide was added to the pretreated chips and the same temperature cycle as described in Example 10 was applied. The reaction mixture was then blown. The pulp was washed and screened and permanganate number and yield were determined. The results were as follows:

TAPPI permanganate number (40 ml.) _____ 22.3
Screened pulp yield, percent on dry wood _____ 46.9
Screen rejects, percent on dry wood (retained on
   $12/1000''$ cut screen) _____ 0.8

A comparison of these data with the results reported in Example 10 shows that the chip pretreatment with hydrogen sulfide in the presence of a small quantity of sodium carbonate, resulted in a screened pulp yield increase of approximately 6% on dry wood and a reduction of screen rejects from 1.5 to 0.8% on dry wood. Also a slightly smaller quantity of sodium sulfite and sodium hydroxide was required with the pretreated chips to give a pulp with a TAPPI permanganate number of 22 to 23.

A standard Valley beater evaluation of the pretreatment alkaline sulfite pulp provided the following results after 35 minutes beating:

Mullen _____ 184
Breaking length, km. _____ 11.6
Apparent specific gravity of sheet _____ 0.67

These data indicate that the quality of the pretreatment-alkaline sulfite pulp was very similar to that of the alkaline sulfite pulp described in Example 10.

What is claimed is:

1. In an alkaline pulping process wherein lignocellulosic material is digested under heat and pressure in an alkaline digesting liquor, the improvement which comprises pretreating the lignocellulosic material before said material is contacted with the digesting liquor, with hydrogen sulfide in combination with an alkaline buffer compatible with the pulping liquors of said alkaline pulping process, said pretreatment being conducted under conditions of temperature, pressure and time that effect reaction of said hydrogen sulfide with said lignocellulosic material and provide higher pulp yields calculated on the dry weight of the lignocellulosic material, said buffer being added in an amount sufficient to maintain the pH of the spent pretreatment liquor in the neutral to mildly alkaline range as measured after the pressure has been released.

2. The process according to claim 1 wherein the pretreated lignocellulosic material is contacted with the digesting liquor in the kraft pulping process.

3. The process according to claim 1 wherein the lignocellulosic material comprises wood chips.

4. The process according to claim 3 wherein the pretreatment with hydrogen sulfide is conducted at temperatures of about 180 to 330° F. and pressures of about 80 to 500 p.s.i.g. for periods up to about 213 minutes.

5. The process according to claim 4 wherein the wood chips are first impregnated with buffer and then the impregnated chips are contacted with hydrogen sulfide under heat and pressure.

6. The process according to claim 4 wherein the wood chips are contacted simultaneously with the buffer and hydrogen sulfide.

7. The process according to claim 4 wherein the buffer is selected from the group consisting of sodium carbonate, sodium hydrogen sulfide, calcium oxide, calcium carbonate, kraft green liquor, soda green liquor, kraft white liquor, soda white liquor, alkaline sulfite green liquor, limestone, and lime.

8. The process according to claim 7 wherein the buffer is present in amounts of 0.3 to 4% by weight based on the dry weight of wood.

9. The process according to claim 4 wherein the pretreatment with hydrogen sulfide is conducted at a temperature in the range of 200 to 330° F.

10. The process according to claim 4 wherein the unused hydrogen sulfide is recovered by pressure relief, collected, compressed and re-used.

11. The process according to claim 4 wherein the spent buffer solution is separated from the chips after the pretreatment, a portion of the spent solution is transferred to a kraft chemical recovery system and the balance is brought to its original concentration and volume by addition of fresh buffer and then re-used.

12. In a soda pulping process wherein lignocellulosic material is digested under heat and pressure, the improvement which comprises pretreating the lignocellulosic material before said material is contacted with the soda digesting liquor, with hydrogen sulfide in combination with an alkaline buffer compatible with the pulping liquors of said soda pulping process, said pretreatment being conducted under conditions of temperature, pressure and time that effect reaction of said hydrogen sulfide with said lignocellulosic material and provide higher pulp yields calculated on the dry weight of the lignocellulosic material, said buffer being added in an amount sufficient to maintain the pH of the spent pretreatment liquor in the neutral to mildly alkaline range as measured after the pressure has been released.

13. The process according to claim 12 wherein the lignocellulosic material is hardwood chips or sawdust.

14. The process according to claim 13 wherein the pretreatment with hydrogen sulfide is conducted at temperatures of about 180 to 330° F. and pressures of about 80 to 500 p.s.i.g. for periods up to about 213 minutes.

15. The process according to claim 14 wherein the lignocellulosic material is first contacted with buffer and then with hydrogen sulfide under heat and pressure.

16. The process according to claim 14 wherein the lignocellulosic material is contacted simultaneously with the buffer and hydrogen sulfide.

17. The process according to claim 14 wherein the buffer is selected from the group consisting of sodium hydroxide, soda green liquor, soda white liquor, calcium oxide and calcium carbonate from the soda pulp mill recausticizing plant or additional sodium carbonate, lime, calcium carbonate or potash.

18. The process according to claim 14 wherein the unused hydrogen sulfide is recovered by pressure relief and condensation of steam, compressed and re-used.

19. The process according to claim 14 wherein the spent buffer solution is separated from the pretreated lignocellulosic material, and is brought to its original concentration and volume by the addition of fresh buffer and then re-used.

20. In an alkaline sulfite pulping process wherein lignocellulosic material is digested under heat and pressure in an alkaline digesting liquor, the improvement which comprises pretreating the lignocellulosic material before said material is contacted with the sulfite digesting liquor, with hydrogen sulfide in combination with an alkaline buffer compatible with the pulping liquors of said alkaline sulfite pulping process, said pretreatment being conducted under conditions of temperature, pressure and time that effect reaction of said hydrogen sulfide with said lignocellulosic material and provide higher pulp yields calculated on the dry weight of the lignocellulosic material, said buffer being added in an amount sufficient to maintain the pH of the spent pretreatment liquor in the neutral to mildly alkaline range as measured after the pressure has been released.

21. The process according to claim 20 wherein the lignocellulosic material is wood chips or sawdust.

22. The process according to claim 20 wherein the lignocellulosic material is first contacted with buffer and then with hydrogen sulfide under heat and pressure.

23. The process according to claim 20 wherein the lignocellulosic material is contacted simultaneously with the buffer and hydrogen sulfide.

24. The process according to claim 20 wherein the buffer is selected from the group consisting of alkaline sulfite green liquor, calcium oxide and calcium carbonate from the sulfite pulp mill recausticizing plant or additional sodium carbonate, sodium hydroxide, lime, calcium carbonate or potash.

25. The process according to claim 20 wherein the spent buffer solution is separated from the pretreated lignocellulosic material, and is brought to its original concentration and volume by the addition of fresh buffer and then re-used.

References Cited

UNITED STATES PATENTS

| 1,576,643 | 3/1926 | Decker | 162—63 X |
| 1,633,736 | 6/1927 | Fish | 162—82 X |
| 2,007,024 | 7/1935 | Richter | 162—82 X |

FOREIGN PATENTS 29,611  11/1958  Finland.

HOWARD R. CAINE, Primary Examiner

U.S. Cl. X.R.

162—44, 45, 82